United States Patent
Kunt et al.

(10) Patent No.: US 11,924,850 B2
(45) Date of Patent: *Mar. 5, 2024

(54) METHOD AND APPARATUS FOR AUTONOMOUS RETRANSMISSIONS ON CONFIGURED GRANTS IN MOBILE COMMUNICATIONS

(71) Applicant: MediaTek Singapore Pte. Ltd., Singapore (SG)

(72) Inventors: Mehmet Kunt, Cambridge (GB); Pradeep Jose, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,995

(22) Filed: Jul. 25, 2022

(65) Prior Publication Data

US 2022/0361234 A1    Nov. 10, 2022

Related U.S. Application Data

(63) Continuation of application No. 16/865,271, filed on May 1, 2020, now Pat. No. 11,432,320.

(Continued)

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1819* (2013.01); *H04L 1/189* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 11,432,320 B2* | 8/2022 | Kunt | H04W 72/23 |
| 2020/0351832 A1* | 11/2020 | Baek | H04L 1/08 |
| 2021/0297195 A1* | 9/2021 | Liu | H04L 1/188 |

OTHER PUBLICATIONS

China National Intellectual Property Administration, First Office Action in China Patent Application No. 202080001927.0, dated Mar. 25, 2023.

(Continued)

*Primary Examiner* — Anh Ngoc M Nguyen
(74) *Attorney, Agent, or Firm* — Han IP PLLC; Andy M. Han (57) ABSTRACT

Various solutions for autonomous retransmission on configured grant with respect to user equipment and network apparatus in mobile communications are described. An apparatus may start a first timer and a second timer when a transmission is performed on a hybrid automatic repeat request (HARQ) process configured for a configured grant. The apparatus may perform an autonomous retransmission using the configured grant when the second timer is expired. The apparatus may cancel restart of the first timer when the autonomous retransmission is performed. The apparatus may restart the second timer when the autonomous retransmission is performed. The apparatus may stop the second timer when the first timer expires. The apparatus may stop the second timer at the activation of a type 2 configured grant.

20 Claims, 7 Drawing Sheets

Related U.S. Application Data (60) Provisional application No. 62/842,613, filed on May 3, 2019.

(51) Int. Cl.
*H04L 1/1867* (2023.01)
*H04L 5/00* (2006.01)

(56) References Cited

OTHER PUBLICATIONS

Mediatek Inc.: "Configured grant retransmission timer", 3GPP TSG-RAN WG2 Meeting #106, R2-1907056, Reno, USA, May 13-17, 2019.

* cited by examiner

METHOD AND APPARATUS FOR AUTONOMOUS RETRANSMISSIONS ON CONFIGURED GRANTS IN MOBILE COMMUNICATIONS

CROSS REFERENCE TO RELATED PATENT APPLICATION(S)

The present disclosure is part of a continuation of U.S. patent application Ser. No. 16/865,271, filed 1 May 2020 as a non-provisional application claiming the priority benefit of U.S. Patent Application No. 62/842,613, filed 3 May 2019. Contents of aforementioned applications are herein incorporated by reference in their entirety.

TECHNICAL FIELD

The present disclosure is generally related to mobile communications and, more particularly, to autonomous retransmissions on configured grants with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR) or Industrial Internet of Things (IIoT), the network node may configure two types of uplink grants for the user equipment (UE) to perform uplink transmissions. The uplink grant may indicate some specific radio resources (e.g., time and frequency resources) for the UE to perform uplink transmission. One type of the uplink grant may comprise the dynamic grant. The dynamic grant may be configured based on the UE's request. For example, the UE may transmit a prior request (e.g., scheduling request (SR), random access preamble or buffer status report (BSR)) to the network. After receiving the request, the network may configure the dynamic grant according to UE's request for the UE to perform uplink data transmission.

The other type of the uplink grant may comprise the configured grant. The configured grant may be configured by the network without UE's request. The uplink transmission based on the configured grant may also be called as a grant-free transmission. The uplink transmission on configured grants may be used to address the requirements of specific services in wireless communications. For example, it can be used for voice over internet protocol (VoIP) services or ultra-reliable and low latency communications (URLLC) services in NR. The UE may be configured to transmit its uplink data on the configured grant without transmitting a prior request to improve the transmission latency. The network may pre-configure specific radio resources (e.g., time and frequency resources) for the UE to perform the uplink configured grant transmissions.

For uplink transmission on configured grants, the UE may be configured with a time duration to perform retransmissions for a hybrid automatic repeat request (HARQ) process. If the network node does not receive or decode the uplink transmission successfully, the network node may provide an uplink grant to the UE for the retransmission. In NR Release-15, a configured grant timer (CGT) is used to protect the HARQ buffer from being overwritten by new data for a HARQ process configured for configured grant. If the CGT is not running at the configured grant occasion, a new data indication (NDI) is toggled and HARQ buffer can be overwritten with new data. The CGT may be started when an uplink grant addressed to cell-radio network temporary identifier (C-RNTI) or configured scheduling-RNTI (CS-RNTI) is received for a HARQ process configured for a configured grant, or when an uplink transmission is performed for a HARQ process configured for a configured grant. The CGT may be stopped at the activation of a type 2 configured grant so that the HARQ buffer can be refreshed before applying the new configuration.

In NR Release-16, a new configured grant retransmission timer (CGRT) is introduced. The new timer is introduced for autonomous retransmissions on configured grant for the case of the transport block previously being transmitted on a configured grant. The new CGRT will be used to trigger autonomous retransmissions using the configured grants. When the timer expires, the UE will assume that negative acknowledgement (NACK) has been received for the corresponding HARQ process and initiate a retransmission on a next available configured grant occasion. The new timer may be started when the transport block is transmitted on the configured grant and stopped upon reception of HARQ feedback (e.g., downlink feedback information (DFI)) or dynamic grant for the HARQ process. The legacy configured grant timer and behaviour is kept for preventing the configured grant overriding the transport block scheduled by dynamic grant, i.e., it is (re)started upon reception of the PDCCH for an uplink grant addressed to cell-radio network temporary identifier (C-RNTI) or configured scheduling-RNTI (CS-RNTI) as well as transmission on the PUSCH of dynamic grant, for a HARQ process configured for a configured grant. However, as the CGT and the new retransmission timer (e.g., CGRT) can co-exist, the interaction and behaviour between these two timers need to be specified. Otherwise, some issues/problems may occur if the interaction and behaviour between these two timers are not clear and defined.

Accordingly, how to define/determine the interaction between the existing timer and the newly introduced timer becomes an important issue for the newly developed wireless communication network. Therefore, it is needed to provide and define proper behavior/operations for the UE to perform transmissions, network requested retransmissions, and autonomous retransmissions on configured grants based on these two timers.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to autonomous retransmissions on configured grants with respect to user equipment and network apparatus in mobile communications.

In one aspect, a method may involve an apparatus starting a first timer and a second timer when a transmission is performed on a HARQ process configured for a configured grant. The method may also involve the apparatus performing an autonomous retransmission using the configured grant when the second timer is expired, i.e. when it is not running. The method may further involve the apparatus cancelling restart of (i.e. continuing with) the first timer when the autonomous retransmission is performed. The method may further involve the apparatus restarting, by the processor, the second timer when the autonomous retransmission is performed. The method may further involve the apparatus stopping the second timer when the first timer expires. The method may further involve the apparatus stopping the second timer at the activation of a type 2 configured grant.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising starting a first timer and a second timer when a transmission is performed on a HARQ process configured for a configured grant. The processor may also perform operations comprising performing, via the transceiver, an autonomous retransmission using the configured grant when the second timer is expired. The processor may further perform operations comprising cancelling restart of (i.e. continuing with) the first timer when the autonomous retransmission is performed. The processor may further perform operations comprising restarting the second timer when the autonomous retransmission is performed. The processor may further perform operations comprising stopping the second timer when the first timer expires. The processor may further perform operations comprising stopping the second timer at the activation of a type 2 configured grant.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to autonomous retransmissions on configured grants with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

For uplink transmission on configured grants, the UE may be configured with a time duration to perform retransmissions for a HARQ process. If the network node does not receive or decode the uplink transmission successfully, the network node may provide an uplink grant to the UE for the retransmission. In NR Release-15, a CGT is used to protect the HARQ buffer from being overwritten by new data for a HARQ process configured for configured grant. If the CGT is not running at the configured grant occasion, an NDI is toggled and HARQ buffer can be overwritten with new data. The CGT may be started when an uplink grant addressed to C-RNTI or CS-RNTI is received for a HARQ process configured for a configured grant, or when an uplink transmission is performed for a HARQ process configured for a configured grant. The CGT may be stopped at the activation of a type 2 configured grant so that the HARQ buffer can be refreshed before applying the new configuration.

In NR Release-16, a new timer (e.g., CGRT) is introduced. The new timer is introduced for auto retransmissions (e.g., timer expiry=HARQ NACK) on configured grant for the case of the transport block previously being transmitted on a configured grant. The new CGRT will be used to trigger autonomous retransmissions using the configured grants. When the timer expires, the UE will assume that NACK has been received for the corresponding HARQ process and initiate a retransmission on a next available configured grant occasion. The new timer may be started when the transport block is actually transmitted on the configured grant and stopped upon reception of HARQ feedback (e.g., downlink feedback information) or dynamic grant for the HARQ process. The legacy configured grant timer and behaviour is kept for preventing the configured grant overriding the transport block scheduled by dynamic grant, i.e., it is (re)started upon reception of the PDCCH for an uplink grant addressed to C-RNTI or CS-RNTI as well as transmission on the PUSCH of dynamic grant, for a HARQ process configured for a configured grant. However, as the CGT and the new retransmission timer (e.g., CGRT) can co-exist, the interaction and behaviour between these two timers need to be specified. Otherwise, some issues/problems may occur if the interaction and behaviour between these two timers are not clear and defined.

Figure 1:
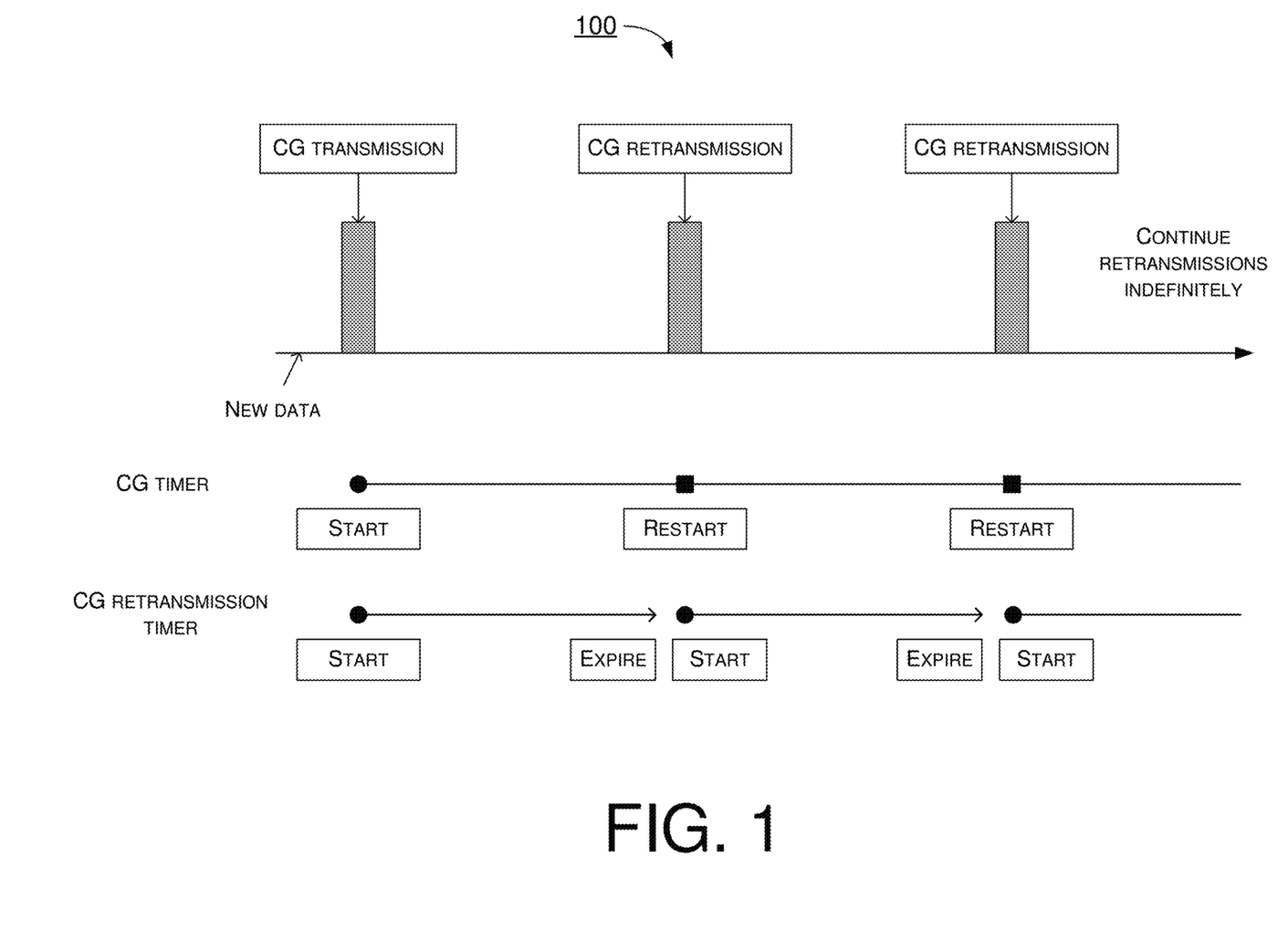
FIG. 1 is a diagram depicting an example scenario showing issues in accordance with the present disclosure.

FIG. 1 illustrates an example scenario 100 showing issues in accordance with the present disclosure. Scenario 100 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 100 illustrates the legacy operations of CGT in NR Release-15. When the new data occur for uplink transmissions on the configured grants, the UE may be configured to perform a configured grant (CG) transmission. Then, the UE may start a CGT to protect the HARQ buffer from being overwritten for a HARQ process configured for configured grant. On the other hand, when the CG transmission is performed, the UE may also start a CGRT for initiating autonomous retransmissions in an event that there is no feedback (e.g., uplink grant or DFI) received from the network node. When the CGRT is expired, the UE may be configured to perform a CG retransmission and start the CGRT again for further autonomous retransmissions. However, when the CG retransmission is performed, the UE will also restart the CGT according to the trigger condition of the CGT. As long as the CGT is running, the UE will restart the CGRT whenever the CGRT is expired. Therefore, in an event that the CGT is restarted at every CG retransmission, the CGT will not be stopped and the CGRT will keep restarting continuously. Thus, the UE could continue the autonomous retransmissions indefinitely.

Figure 2:
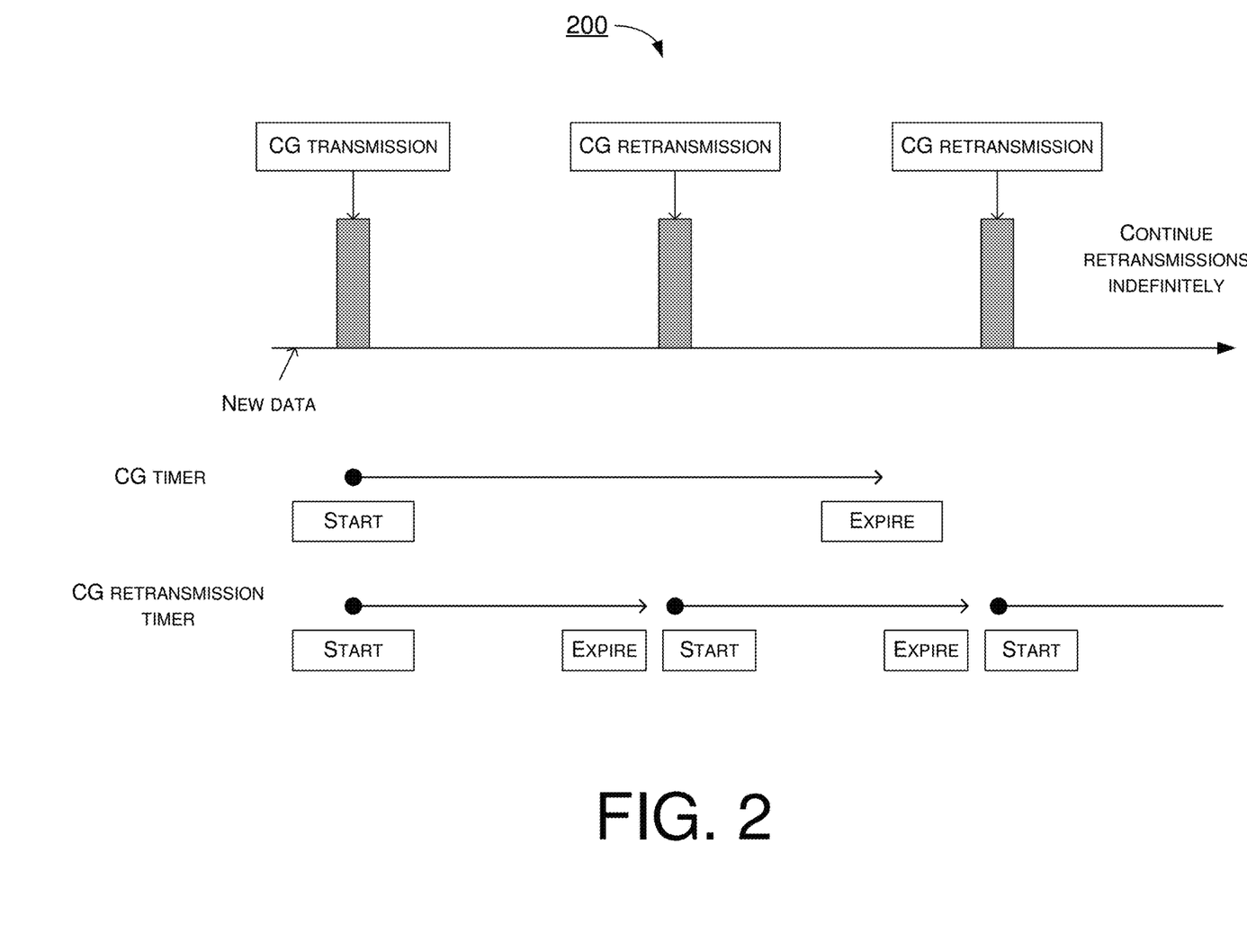
FIG. 2 is a diagram depicting an example scenario showing issues in accordance with the present disclosure.

FIG. 2 illustrates an example scenario 200 showing issues in accordance with the present disclosure. Scenario 200 involves a UE and a network node, which may be a part of a wireless communication network. Scenario 200 illustrates possible issues which may occur due to the newly introduced CGRT. Similarly, when the new data occur for uplink transmissions on the configured grants, the UE may be configured to perform a CG transmission. Then, the UE may start a CGT to protect the HARQ buffer from being overwritten for a HARQ process configured for configured grant. The UE may also start a CGRT for initiating autonomous retransmissions in an event that there is no feedback (e.g., uplink grant or DFI) received from the network node. When the CGRT is expired, the UE may be configured to perform a CG retransmission and start the CGRT again for further autonomous retransmissions. However, in scenario 200, when the CGT is expired, the CGRT is not stopped as well. Therefore, the UE will keep running the CGRT and perform the CG retransmission again when the CGRT is expired. Thus, in an event that the CGRT is not stopped at the CGT expiry, the UE could continue the autonomous retransmissions indefinitely.

Figure 3:
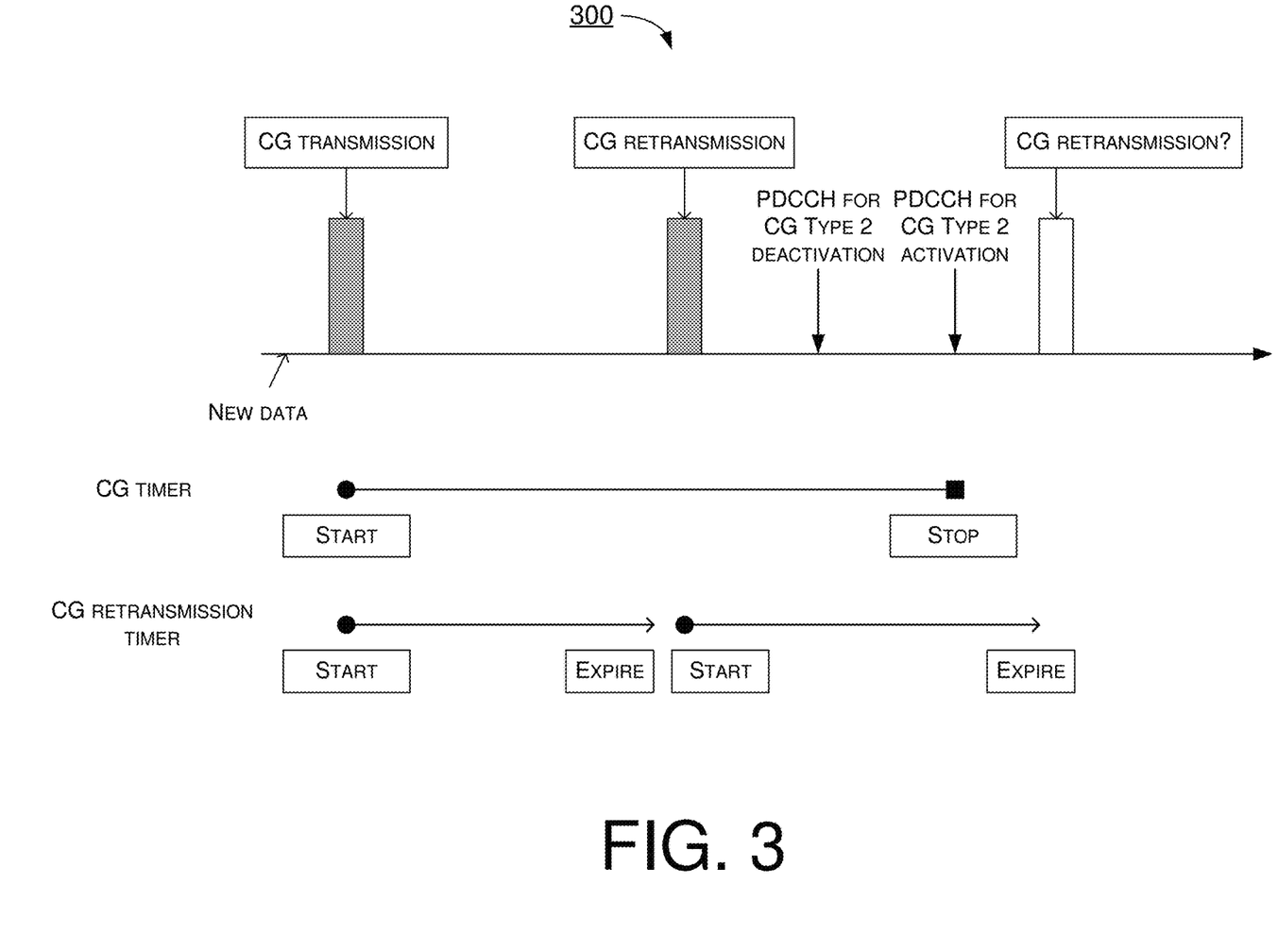
FIG. 3 is a diagram depicting an example scenario showing issues in accordance with the present disclosure.

FIG. 3 illustrates an example scenario 300 showing issues in accordance with the present disclosure. Scenario 300 involves a UE and a network node, which may be a part of a wireless communication network. Scenario 300 illustrates possible issues which may occur due to the newly introduced CGRT. Similarly, when the new data occur for uplink transmissions on the configured grants, the UE may be configured to perform a CG transmission. Then, the UE may start a CGT to protect the HARQ buffer from being overwritten for a HARQ process configured for configured grant. The UE may also start a CGRT for initiating autonomous retransmissions in an event that there is no feedback (e.g., uplink grant or DFI) received from the network node. When the CGRT is expired, the UE may be configured to perform a CG retransmission and start the CGRT again for further autonomous retransmissions. According to NR Release-15, when the UE receives the physical downlink control channel (PDCCH) for CG Type 2 activation, the UE may stop the CGT. However, there is no clear definition for the CGRT when receiving the PDCCH for CG Type 2 activation. In an event that the CGRT is not stopped at the CG Type 2 activation, the retransmission behaviour on the UE may be undefined/unclear because the transport block (TB) size might have changed.

Figure 4:
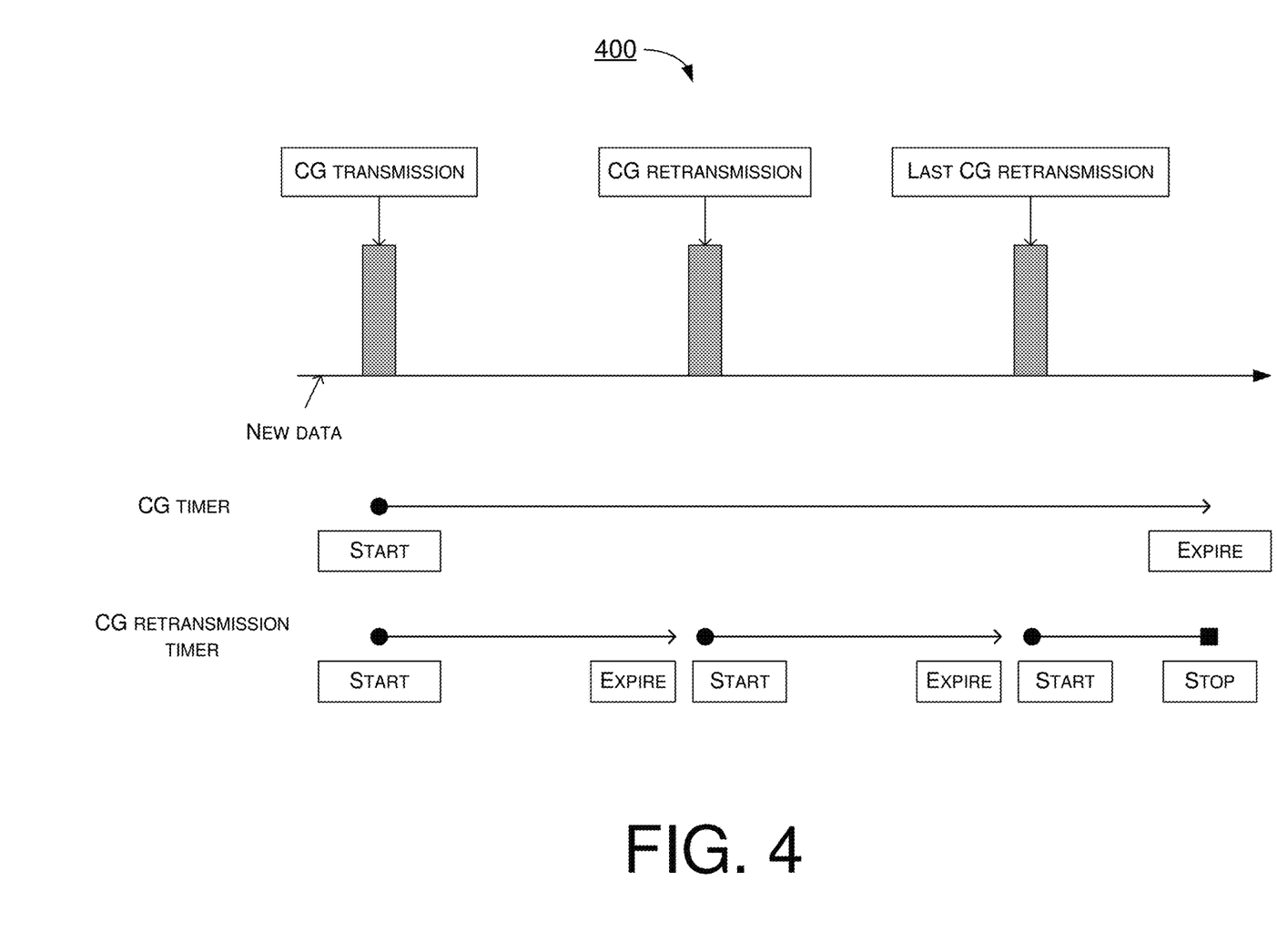
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 400 illustrates the proper interactions/operations between the CGT and the CGRT. When the new data occur for uplink transmissions on the configured grants, the UE may be configured to perform a CG transmission. Then, the UE may start a first timer (e.g., CGT) to protect the HARQ buffer from being overwritten for a HARQ process configured for configured grant. On the other hand, when the CG transmission is performed, the UE may also start a second timer (e.g., CGRT) for initiating autonomous retransmissions in an event that there is no feedback (e.g., uplink grant or DFI) received from the network node. When the second timer is expired, the UE may be configured to perform a CG retransmission (e.g., autonomous retransmission) and restart the second timer for further autonomous retransmissions. The first timer should not be restarted when the second timer expires and when a CG retransmission is performed. Otherwise, the first timer will never expire, and the retransmissions will continue indefinitely. The first timer should be used to limit the duration for performing the retransmissions. After the first timer expires, the UE should stop autonomous retransmissions of the data in the HARQ buffer.

Specifically, the UE may be configured to cancel restart of the first timer when the autonomous retransmission is performed. In other words, the first timer is not restarted when an autonomous retransmission is performed after the expiry of the second timer. The UE may be configured to continue the first timer and restart the second timer when the autonomous retransmission is performed. After the last CG retransmission is performed, the first timer should be expired to limit the duration for performing the retransmissions. Thus, the UE may be configured to determine whether the first timer is expired. The UE may be configured to stop the second timer in an event that the first timer is expired. Since the second timer is stopped, the UE may be configured to stop the autonomous retransmission in an event that the first timer is expired. This will ensure that the UE does not attempt further retransmissions after the expiry of the first timer. Accordingly, since the second timer is stopped at the expiry of the first timer, the UE may not continue the autonomous retransmissions indefinitely. The duration of performing autonomous retransmissions may be properly ended by the expiry of the first timer and stopping of the second timer.

Figure 5:
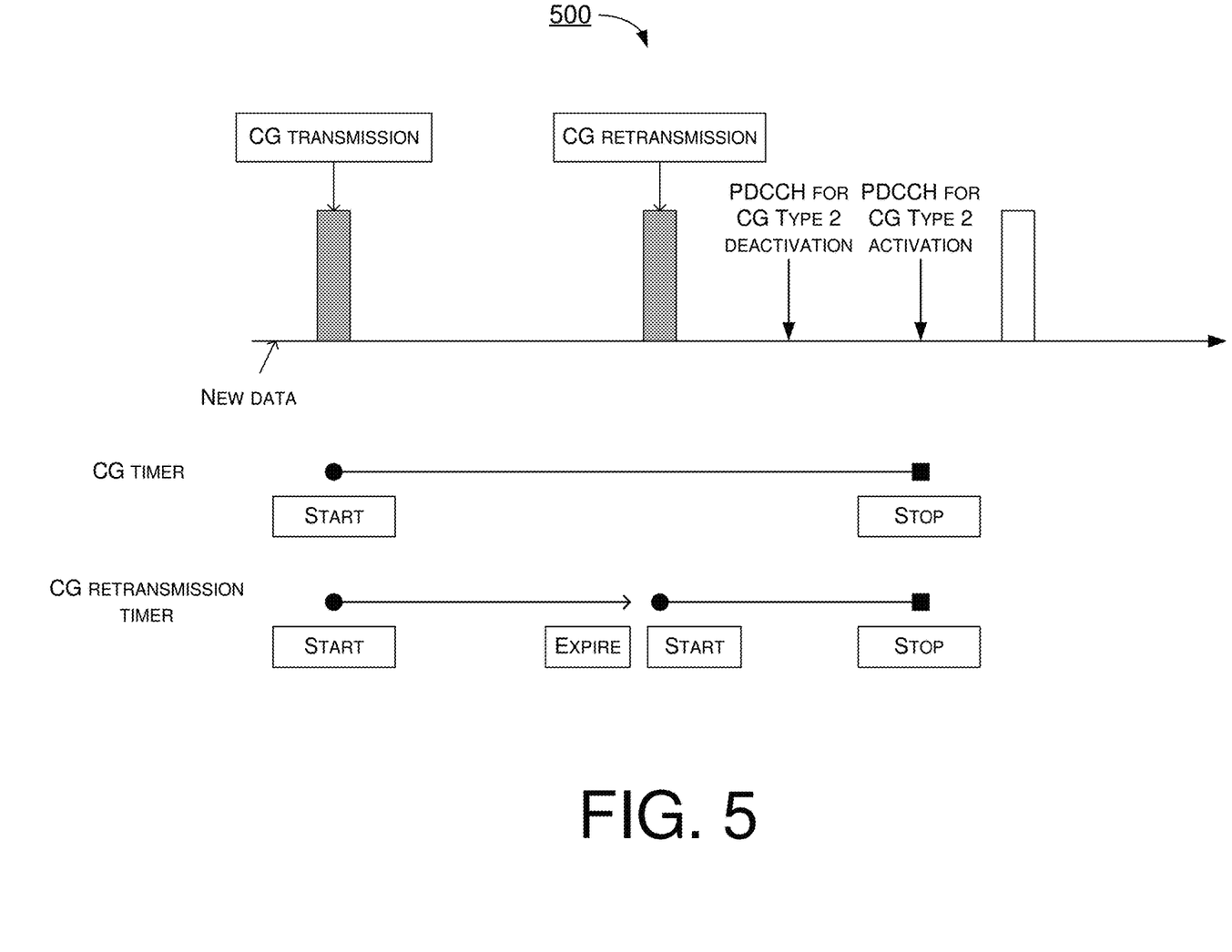
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 500 illustrates the proper interactions/operations between the CGT and the CGRT. Similarly, when the new data occur for uplink transmissions on the configured grants, the UE may be configured to perform a CG transmission. Then, the UE may start a first timer (e.g., CGT) to protect the HARQ buffer from being overwritten for a HARQ process configured for configured grant. On the other hand, when the CG transmission is performed, the UE may also start a second timer (e.g., CGRT) for initiating autonomous retransmissions in an event that there is no feedback (e.g., uplink grant or DFI) received from the network node. When the second timer is expired, the UE may be configured to perform a CG retransmission (e.g., autonomous retransmission) and restart the second timer for further autonomous retransmissions.

The UE may be configured to determine whether a specific configured grant is activated. The specific configured grant may comprise a configured grant type 2. The configured grant type 2 comprises an uplink grant provided by the PDCCH and may be stored or cleared as configured uplink grant based on layer 1 (L1) signaling indicating configured uplink grant activation or deactivation. According to NR Release-15, the UE may be configured to stop the first timer when the configured grant type 2 is activated. In addition, the second timer should be stopped when configured grant type 2 is activated in order to avoid retransmission of old data after the new configuration is applied. The properties of the CG such as the transport block size may have changed with the activation. The UE should not attempt to retransmit the old data in the HARQ buffer using the new configuration of the CG. In an event that the old and new grants do not match, the behaviour of the UE at CG retransmission may be undefined. Thus, the UE may further be configured to stop the second timer when the configured grant type 2 is activated to avoid such problem.

In some implementations, after performing the CG transmission or the CG retransmission, the UE may be configured to determine whether an acknowledgement is received. In an event that an acknowledgement is received, it means that the uplink transmission on the configured grant is successful. The UE may not need to perform the CG retransmissions. Thus, the UE may be configured to stop the second timer in an event that the acknowledgement is received.

In some implementations, the value of the second timer (e.g., CGRT) should be smaller than the first timer (e.g., CGT). In an event that this is not the case, the HARQ buffer can be overwritten by new data after the expiry of the first timer. Therefore, it may not always be possible to perform an autonomous retransmission after the expiry of the second timer, which defeats the purpose of introducing a retransmission timer. Thus, in order to perform autonomous retransmissions, the duration of the second timer (e.g., CGRT) should be shorter than the first timer (e.g., CGT).

Illustrative Implementations

Figure 6:
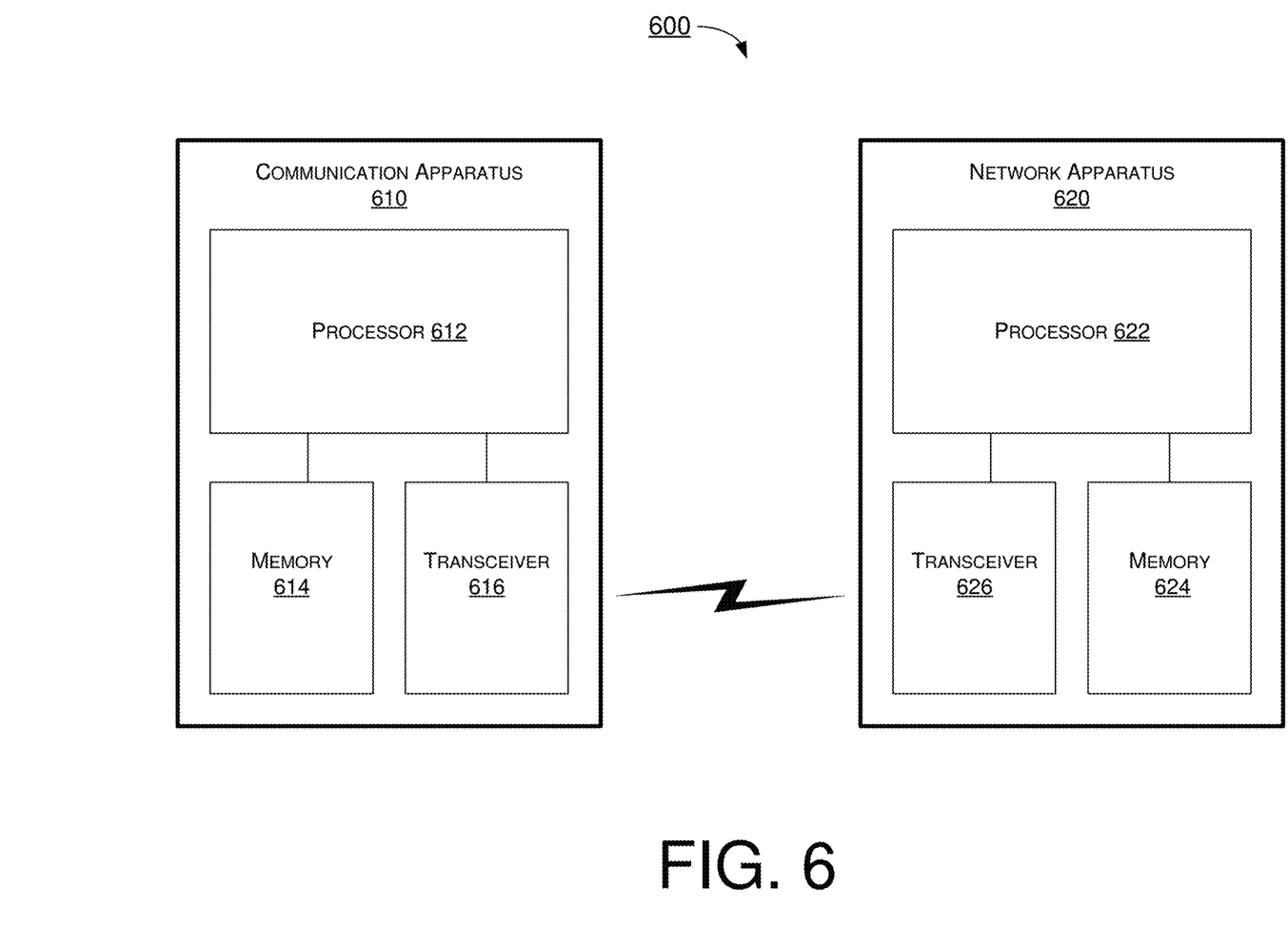
FIG. 6 is a block diagram of an example communication apparatus and an example network apparatus in accordance with an implementation of the present disclosure.
Figure 7:
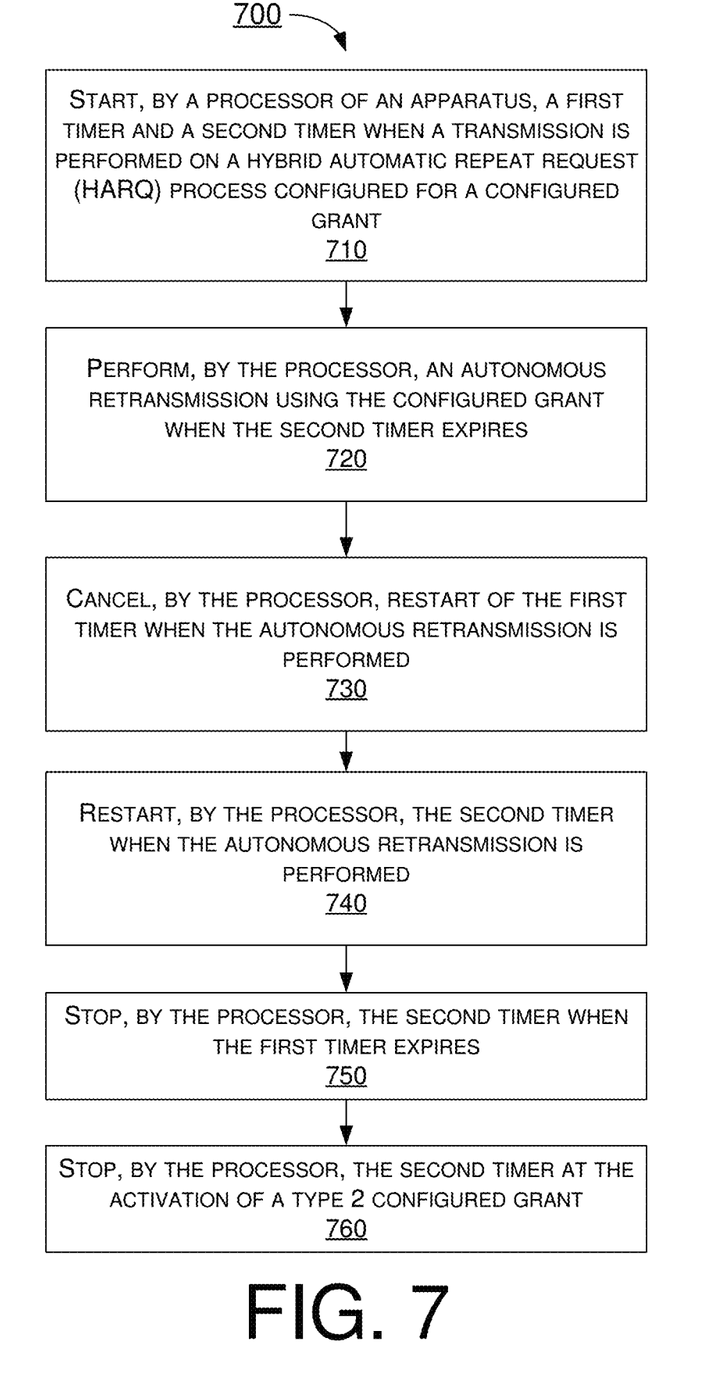
FIG. 7 is a flowchart of an example process in accordance with an implementation of the present disclosure.

FIG. 6 illustrates an example communication apparatus 610 and an example network apparatus 620 in accordance with an implementation of the present disclosure. Each of communication apparatus 610 and network apparatus 620 may perform various functions to implement schemes, techniques, processes and methods described herein pertaining to autonomous retransmission on configured grant with respect to user equipment and network apparatus in wireless communications, including scenarios described above as well as process 700 described below.

Communication apparatus 610 may be a part of an electronic apparatus, which may be a UE such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Communication apparatus 610 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 610 may include at least some of those components shown in FIG. 6 such as a processor 612, for example. Communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node such as a base station, a small cell, a router or a gateway. For instance, network apparatus 620 may be implemented in an eNodeB in an LTE, LTE-Advanced or LTE-Advanced Pro network or in a gNB in a 5G, NR, IoT, NB-IoT or IIoT network. Alternatively, network apparatus 620 may be implemented in the form of one or more IC chips such as, for example and without limitation, one or more single-core processors, one or more multi-core processors, or one or more RISC or CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including power consumption reduction in a device (e.g., as represented by communication apparatus 610) and a network (e.g., as represented by network apparatus 620) in accordance with various implementations of the present disclosure.

In some implementations, communication apparatus 610 may also include a transceiver 616 coupled to processor 612 and capable of wirelessly transmitting and receiving data. In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively. To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node of a communication network.

In some implementations, when the new data occur for uplink transmissions on the configured grants, processor 612 may be configured to perform, via transceiver 616, a CG transmission. Then, processor 612 may start a first timer (e.g., CGT) to protect the HARQ buffer in memory 614 from being overwritten for a HARQ process configured for configured grant. On the other hand, when the CG transmission is performed, processor 612 may also start a second timer (e.g., CGRT) for initiating autonomous retransmissions in an event that there is no feedback (e.g., uplink grant or DFI) received from network apparatus 620. When the second timer is expired, processor 612 may be configured to perform, via transceiver 616, a CG retransmission (e.g., autonomous retransmission) and restart the second timer for further autonomous retransmissions.

In some implementations, processor 612 may be configured to cancel restart of the first timer when the autonomous retransmission is performed. In other words, the first timer is not restarted by processor 612 when an autonomous retransmission is performed after the expiry of the second timer. Processor 612 may be configured to continue the first timer and restart the second timer when the autonomous retransmission is performed. After the last CG retransmission is performed, the first timer should be expired to limit the duration for performing the retransmissions. Thus, processor 612 may be configured to determine whether the first timer is expired. Processor 612 may be configured to stop the second timer in an event that the first timer is expired.

Since the second timer is stopped, processor 612 may be configured to stop the autonomous retransmissions in an event that the first timer is expired. This will ensure that the processor 612 does not attempt further retransmissions after the expiry of the first timer.

In some implementations, processor 612 may be configured to determine whether a specific configured grant is activated. The specific configured grant may comprise a configured grant type 2. According to NR Release-15, processor 612 may be configured to stop the first timer when the configured grant type 2 is activated. In addition, the second timer should be stopped when configured grant type 2 is activated in order to avoid retransmission of old data after the new configuration is applied. The properties of the CG such as the transport block size may have changed with the activation. Processor 612 should not attempt to retransmit the old data in the HARQ buffer using the new configuration of the CG. In an event that the old and new grants do not match, the behaviour of processor 612 at CG retransmission may be undefined. Thus, processor 612 may further be configured to stop the second timer when the configured grant type 2 is activated to avoid such problem.

In some implementations, after performing the CG transmission or the CG retransmission, processor 612 may be configured to determine whether an acknowledgement is received. In an event that an acknowledgement is received, it means that the uplink transmission on the configured grant is successful. Processor 612 may not need to perform the CG retransmissions. Thus, processor 612 may be configured to stop the second timer in an event that the acknowledgement is received.

Illustrative Processes

FIG. 7 illustrates an example process 700 in accordance with an implementation of the present disclosure. Process 700 may be an example implementation of above scenarios/schemes, whether partially or completely, with respect to autonomous retransmission on configured grant with the present disclosure. Process 700 may represent an aspect of implementation of features of communication apparatus 610. Process 700 may include one or more operations, actions, or functions as illustrated by one or more of blocks 710, 720, 730, 740, 750, and 760. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 610 or any suitable UE or machine type devices. Solely for illustrative purposes and without limitation, process 700 is described below in the context of communication apparatus 610. Process 700 may begin at block 710.

At 710, process 700 may involve processor 612 of apparatus 610 starting a first timer and a second timer when a transmission is performed on a HARQ process configured for a configured grant. Process 700 may proceed from 710 to 720.

At 720, process 700 may involve processor 612 performing an autonomous retransmission using the configured grant when the second timer is expired. Process 700 may proceed from 720 to 730.

At 730, process 700 may involve processor 612 cancelling restart of (i.e. continuing with) the first timer when the autonomous retransmission is performed. Process 700 may proceed from 730 to 740.

At 740, process 700 may involve processor 612 restarting the second timer when the autonomous retransmission is performed. Process 700 may proceed from 740 to 750.

At 750, process 700 may involve processor 612 stopping the second timer when the first timer expires. Process 700 may proceed from 750 to 760.

At 760, process 700 may involve processor 612 stopping the second timer at the activation of a type 2 configured grant.

In some implementations, the first timer may comprise a CGT. The second time may comprise a CGRT.

In some implementations, the first timer is not restarted when the second timer is expired.

In some implementations, process 700 may involve processor 612 continuing the first timer when the autonomous retransmission is performed.

In some implementations, process 700 may involve processor 612 determining whether the first timer is expired. Process 700 may further involve processor 612 stopping the second timer in an event that the first timer is expired.

In some implementations, process 700 may involve processor 612 determining whether a specific configured grant is activated. Process 700 may further involve processor 612 stopping the second timer in an event that the specific configured grant is activated.

In some implementations, the specific configured grant may comprise a configured grant type 2.

In some implementations, process 700 may involve processor 612 determining whether an acknowledgement is received. Process 700 may further involve processor 612 stopping the second timer in an event that the acknowledgement is received.

In some implementations, process 700 may involve processor 612 determining whether the first timer is expired. Process 700 may further involve processor 612 stopping the autonomous retransmission in an event that the first timer is expired.

In some implementations, the second timer is shorter than the first timer.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
starting, by a processor of an apparatus, a first timer and a second timer when a transmission is performed on a hybrid automatic repeat request (HARQ) process configured for a configured grant;
performing, by the processor, an autonomous retransmission using the configured grant when the second timer is not running;
restarting, by the processor, the second timer when the autonomous retransmission is performed;
determining, by the processor, whether a specific configured grant is activated; and
stopping, by the processor, both the first timer and the second timer in an event that the specific configured grant is activated,
wherein a configuration of the configured grant is changed responsive to the specific configured grant being activated.

2. The method of claim 1, wherein the first timer comprises a configured grant timer (CGT), and wherein the second timer comprises a configured grant retransmission timer (CGRT).

3. The method of claim 1, wherein the first timer is not restarted when the second timer is expired.

4. The method of claim 1, wherein the specific configured grant comprises a configured grant type 2.

5. The method of claim 1, wherein the second timer is shorter than the first timer.

6. The method of claim 1, wherein the configuration of the configured grant comprises a transport block size.

7. The method of claim 1, further comprising:
continuing, by the processor, the first timer when the autonomous retransmission is performed.

8. The method of claim 1, further comprising:
determining, by the processor, whether the first timer is expired; and
stopping, by the processor, the second timer in an event that the first timer is expired.

9. The method of claim 1, further comprising:
determining, by the processor, whether an acknowledgement is received; and
stopping, by the processor, the second timer in an event that the acknowledgement is received.

10. The method of claim 1, further comprising:
determining, by the processor, whether the first timer is expired; and
stopping, by the processor, the autonomous retransmission in an event that the first timer is expired.

11. An apparatus, comprising:
a transceiver which, during operation, wirelessly communicates with network nodes of a wireless network; and
a processor communicatively coupled to the transceiver such that, during operation, the processor performs operations comprising:
starting a first timer and a second timer when a transmission is performed on a hybrid automatic repeat request (HARQ) process configured for a configured grant;
performing, via the transceiver, an autonomous retransmission using the configured grant when the second timer is not running;
restarting the second timer when the autonomous retransmission is performed;
determining whether a specific configured grant is activated; and
stopping both the first timer and the second timer in an event that the specific configured grant is activated,
wherein a configuration of the configured grant is changed responsive to the specific configured grant being activated.

12. The apparatus of claim 11, wherein the first timer comprises a configured grant timer (CGT), and wherein the second timer comprises a configured grant retransmission timer (CGRT).

13. The apparatus of claim 11, wherein the first timer is not restarted when the second timer is expired.

14. The apparatus of claim 11, wherein the specific configured grant comprises a configured grant type 2.

15. The apparatus of claim 11, wherein the second timer is shorter than the first timer.

16. The apparatus of claim 11, wherein the configuration of the configured grant comprises a transport block size.

17. The apparatus of claim 11, wherein, during operation, the processor further performs operations comprising:
continuing the first timer when the autonomous retransmission is performed.

18. The apparatus of claim 11, wherein, during operation, the processor further performs operations comprising:
determining whether the first timer is expired; and
stopping the second timer in an event that the first timer is expired.

19. The apparatus of claim 11, wherein, during operation, the processor further performs operations comprising:
determining whether an acknowledgement is received; and
stopping the second timer in an event that the acknowledgement is received.

20. The apparatus of claim 11, wherein, during operation, the processor further performs operations comprising:
determining whether the first timer is expired; and
stopping the autonomous retransmission in an event that the first timer is expired.

* * * * *